United States Patent [19]

Nishizawa et al.

[11] Patent Number: 5,885,914
[45] Date of Patent: *Mar. 23, 1999

[54] ALKALI-FREE GLASS AND DISPLAY SUBSTRATE

[75] Inventors: Manabu Nishizawa; Yasumasa Nakao, both of Yokohama, Japan

[73] Assignee: Asahi Glass Company Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 685,634

[22] Filed: Jul. 24, 1996

[30] Foreign Application Priority Data

Jul. 28, 1995 [JP] Japan ..................................... 7-193441

[51] Int. Cl.$^6$ ...................................................... C03L 3/091
[52] U.S. Cl. ................................ 501/66; 501/59; 501/67; 349/158
[58] Field of Search ................................ 501/66, 67, 59; 349/158

[56] References Cited

U.S. PATENT DOCUMENTS

| | | | |
|---|---|---|---|
| 4,409,337 | 10/1983 | Dumbaugh, Jr. et al. | 501/66 |
| 4,824,808 | 4/1989 | Dumbaugh, Jr. | 501/66 |
| 5,116,787 | 5/1992 | Dumbaugh, Jr. et al. | 501/66 |
| 5,116,788 | 5/1992 | Dumbaugh, Jr. | 501/66 |
| 5,116,789 | 5/1992 | Dumbaugh, Jr. et al. | 501/66 |
| 5,244,847 | 9/1993 | Kushitani et al. | 501/66 |
| 5,348,916 | 9/1994 | Kushitani et al. | 501/66 |
| 5,387,560 | 2/1995 | Ponthieu et al. | 501/66 |
| 5,459,109 | 10/1995 | Lapp | 501/66 |
| 5,489,558 | 2/1996 | Moffatt et al. | 501/69 |
| 5,508,237 | 4/1996 | Moffatt et al. | 501/69 |

FOREIGN PATENT DOCUMENTS

| | | |
|---|---|---|
| 1-201041 | 8/1989 | Japan . |
| 4-160030 | 6/1992 | Japan . |

*Primary Examiner*—Karl Group
*Attorney, Agent, or Firm*—Oblon, Spivak, McClelland, Maier & Neustadt, P.C.

[57] ABSTRACT

An alkali-free glass consisting essentially of from 60 to 74 mol % of $SiO_2$, from 10 to 16 mol % of $Al_2O_3$, from 10 to 12 mol % of $B_2O_3$, the molar ratio of $Al_2O_3/B_2O_3$ being from 1.0 to 1.5, from 0 to 5 mol % of MgO, from 0 to 5 mol % of CaO, from 0 to 12 mol % of SrO, from 0 to 12 mol % of BaO, and from 6 to 12 mol % of SrO+BaO, which contains substantially no alkali metal oxide and has a strain point exceeding 650° C. and an average thermal expansion coefficient of at most $40 \times 10^{-7}$/°C. within a range of from 50° to 300° C., and of which the weight loss per unit area after immersion at 25° C. for 20 minutes in a liquid prepared by mixing a 40 wt % ammonium fluoride aqueous solution and a 50 wt % hydrofluoric acid aqueous solution in a volume ratio of 9:1, is less than 0.60 mg/cm$^2$, the weight loss per unit area after immersion at 95° C. for 20 hours in 0.1N HCl, is less than 0.20 mg/cm$^2$, and the liquidus temperature is at most a temperature at which the viscosity is $10^4$ poise.

8 Claims, No Drawings

ALKALI-FREE GLASS AND DISPLAY SUBSTRATE

BACKGROUND OF THE INVENTION

1. Field of the Invention

The present invention relates to an alkali-free glass which is suitable as a substrate glass for various displays or photomasks and which is essentially free from alkali metal oxides.

2. Discussion of Background

Heretofore, the following properties have been required for a substrate glass for various displays, particularly for the one intended to form a thin film of a metal or oxide on its surface.

(1) It is essentially free from alkali metal oxides. If an alkali metal oxide is contained, the alkali metal ion tends to diffuse in the thin film, whereby the film properties will deteriorate.

(2) It has a high strain point, so that when it is exposed to a high temperature during the process for forming a thin film, deformation of the glass and shrinkage due to stabilization of the glass structure are suppressed to the minimum levels.

(3) It has adequate chemical durability against various reagents to be used for forming semiconductors. Particularly, it has durability against hydrofluoric acid used for etching $SiO_x$ or $SiN_x$ or against a buffered hydrofluoric acid (BHF) containing ammonium fluoride and hydrofluoric acid as the main components.

(4) It has no internal or surface defects (such as bubbles, striae, inclusions, pits or scratch marks).

At present, Corning code 7059 glass is widely employed as a substrate glass for various displays or photomasks. However, this glass has the following drawbacks.

(1) The strain point is as low as 593° C., and preliminary heat treatment to reduce the shrinkage of glass has to be carried out prior to a process for preparing the displays.

(2) The amount of elution into hydrochloric acid used for etching a metal electrode or a transparent conductive film (such as ITO) is substantial, and the eluted substance tends to recrystallize during the process for preparing displays, whereby it becomes difficult to prepare the displays.

In addition to solving such problems, in recent years, it has been required to provide a glass having a small thermal expansion coefficient, which is strong against thermal shock in order to increase the temperature raising or lowering rate during the preparation of displays and thus to increase the production throughput.

Japanese Unexamined Patent Publication No. 160844/1989 (which corresponds to U.S. Pat. No. 4,824,808) discloses an alkali-free glass having a strain point of at least 625° C., but the strain point does not exceed 650° C.

Japanese Unexamined Patent Publication No. 160030/1992 discloses an alkali-free glass wherein the amounts of SrO and BaO are limited to certain levels, and some examples have a strain point of at least 650° C. and a thermal expansion coefficient of from $30 \times 10^{-7}$ to $40 \times 10^{-7}/°C$. However, such examples have a liquidus temperature which is higher than a temperature at which the viscosity is $10^4$ poise which is an index for forming, and they are difficult to form by e.g. a float process.

Japanese Unexamined Patent Publication No. 263473/1994 (which corresponds to U.S. Pat. No. 5,374,595) discloses an alkali-free glass having a strain point exceeding 650° C. and a thermal expansion coefficient of from $30 \times 10^{-7}$ to $40 \times 10^{-7}/°C.$, but no evaluation has been made with respect to the resistance against BHF.

Japanese Unexamined Patent Publication No. 201041/1989 discloses an alkali-free glass having a strain point of at least 600° C. and a thermal expansion coefficient of from $40 \times 10^{-7}$ to $50 \times 10^{-7}/°C.$

SUMMARY OF THE INVENTION

It is an object of the present invention to solve the above-mentioned drawbacks and to provide an alkali-free glass which has a strain point exceeding 650° C. and an average thermal expansion coefficient of at most $40 \times 10^{-7}/°C.$ (from 50° to 300° C.), of which the weight loss after immersion in BHF and hydrochloric acid, is small, and which is easy to melt or form.

The present invention provides an alkali-free glass consisting essentially of from 60 to 74 mol % of $SiO_2$, from 10 to 16 mol % of $Al_2O_3$, from 10 to 12 mol % of $B_2O_3$, the molar ratio of $Al_2O_3/B_2O_3$ being from 1.0 to 1.5, from 0 to 5 mol % of MgO, from 0 to 5 mol % of CaO, from 0 to 12 mol % of SrO, from 0 to 12 mol % of BaO, and from 6 to 12 mol % of SrO+BaO, which contains substantially no alkali metal oxide and has a strain point exceeding 650° C. and an average thermal expansion coefficient of at most $40 \times 10^{-7}/°C.$ within a range of from 50° to 300° C., and of which the weight loss per unit area after immersion at 25° C. for 20 minutes in a liquid prepared by mixing a 40 wt % ammonium fluoride aqueous solution and a 50 wt % hydrofluoric acid aqueous solution in a volume ratio of 9:1, is less than 0.60 $mg/cm^2$, the weight loss per unit area after immersion at 95° C. for 20 hours in 0.1N HCl, is less than 0.20 $mg/cm^2$, and the liquidus temperature is at most a temperature at which the viscosity is $10^4$ poise.

DETAILED DESCRIPTION OF THE PREFERRED EMBODIMENTS

Now, the reasons for defining the compositional ranges of the respective components as mentioned above, will be described.

If the content of $SiO_2$ is less than 60 mol %, it tends to be difficult to increase the strain point sufficiently, and the chemical durability tends to deteriorate and the coefficient of thermal expansion tends to increase. If it exceeds 74 mol %, the melting property tends to be poor, and the liquidus temperature tends to increase. Preferably, $SiO_2$ is from 60 to 72 mol %.

The contents of $Al_2O_3$ and $B_2O_3$ and the relation between these amounts are important, so that the glass has a high strain point, a low thermal expansion coefficient and high chemical resistance simultaneously.

$Al_2O_3$ suppresses phase separation of glass, reduces the coefficient of thermal expansion and increases the strain point. If its content is less than 10 mol %, no adequate effects can be obtained, and if it exceeds 16 mol %, the melting property of glass tends to be poor.

$B_2O_3$ suppresses the weight loss of glass by BHF and serves to prevent formation of turbidity by BHF. However, if it is too much, the weight loss of glass due to elution (leaching) of alkaline earth by hydrochloric acid, increases. Namely, if its content is less than 10 mol %, the BHF resistance tends to deteriorate, and if it exceeds 12 mol %, the acid resistance tends to deteriorate, and the strain point tends to be low. Preferably, $B_2O_3$ is from 10.5 to 11.5 mol %.

If the molar ratio of $Al_2O_3/B_2O_3$ is less than 1.0, the amount of $Al_2O_3$ tends to be relatively small, whereby the strain point tends to be low. On the other hand, if the molar ratio exceeds 1.5, the BHF resistance tends to be low.

MgO is not essential but may preferably be contained, as it lowers the coefficient of thermal expansion without lowering the strain point, among alkaline earth metal oxides. If its content exceeds 5 mol %, however, turbidity by BHF, phase separation of glass or an increase of the liquidus temperature tends to occur.

CaO is preferably incorporated to improve the melting property of glass. However, if it exceeds 5 mol %, the coefficient of thermal expansion tends to be large, and the liquidus temperature tends to be high.

SrO is not essential but may be contained, since it serves to suppress phase separation of glass and is a relatively useful component against turbidity by BHF. If the content exceeds 12 mol %, the coefficient of thermal expansion tends to increase. Preferably, SrO is from 3 to 5 mol %.

BaO is not essential but may be contained as a component which is effective for suppressing phase separation of glass, for improving the melting property and for suppressing the liquidus temperature. However, if its content exceeds 12 mol %, the coefficient of thermal expansion tends to increase, and the chemical durability such as acid resistance tends to deteriorate. Its content is preferably from 3 to 5 mol %.

SrO and BaO are required to be incorporated in a total amount of at least 6 mol %, so that the liquidus temperature becomes at most a temperature at which the viscosity is $10^4$ poise, and forming by a float process can readily be carried out. On the other hand, if the total amount exceeds 12 mol %, the thermal expansion coefficient tends to be too large.

In addition to the above components, $ZnO$, $Fe_2O_3$, $SO_3$, F and Cl may be incorporated to the glass of the present invention in a total amount of at most 5 mol %, in order to improve the melting property, the clarity and the forming property of the glass.

The glass of the present invention contains substantially no alkali metal oxide. Further, it preferably contains substantially no $P_2O_5$ or PbO. Such a component is likely to adversely affect a coating film of e.g. a transistor which will be formed on the substrate, when the glass is used for a display as a preferred application of the present invention.

The glass of the present invention has a strain point exceeding 650° C., whereby the pretreatment to reduce the shrinkage of glass in a process for producing a display, can be eliminated depending upon the annealing conditions. Further, it has an average thermal expansion coefficient of at most $40 \times 10^{-7}/°C.$ within a range of from 50° to 300° C., whereby it is relatively strong against thermal shock, and it is thereby possible to improve the production throughput. The average thermal expansion coefficient is preferably from $30 \times 10^{-7}$ to $40 \times 10^{-7}/°C.$ within a range of from 50° to 300° C.

Further, the weight loss per unit area after immersion at 25° C. or 20 minutes in a liquid prepared by mixing a 40 wt % of ammonium fluoride aqueous solution and a 50 wt % hydrofluoric acid aqueous solution in a volume ratio of 9:1, is less than 0.60 mg/cm$^2$, and the weight loss per unit area after immersion at 95° C. for 20 hours in 0.1N HCl, is less than 0.20 mg/cm$^2$, whereby even when such a glass is used as a substrate for a liquid crystal display panel of a thin film transistor system, it is sufficiently durable against chemical treatment during the process for preparation of the panel. For the HCl resistance, the above weight loss is more preferably less than 0.18 mg/cm$^2$, and for the BHF resistance, the above weight loss is more preferably less than 0.58 mg/cm$^2$, particularly preferably less than 0.56 mg/cm$^2$.

Further, the liquidus temperature is at most a temperature at which the viscosity is $10^4$ poise, whereby forming can be facilitated. It is particularly advantageous that the production can be carried out by a float process which is suitable for mass production.

The glass of the present invention may be prepared, for example, by the following method.

Raw materials commonly used for the respective components are mixed to have a desired composition, and the mixture is continuously introduced into a melting furnace and heated and melted at a temperature of from 1500° to 1600° C. This molten glass is formed to have a predetermined thickness by a float process or a downdraw process and annealed, followed by cutting.

EXAMPLES 1 to 47

Tables 1 to 10 show Test Examples. The respective compositions were represented by three types of units i.e. mol %, wt % and cation % (cat %).

Raw materials for the respective components were mixed to have a desired composition and melted at a temperature of from 1500° to 1600° C. by means of a platinum crucible. During the melting, a platinum stirrer was used for stirring to homogenize the glass. Then, the molten glass was cast and formed into a sheet, followed by annealing. In the Tables, the glass compositions as well as the thermal expansion coefficients a, high temperature viscosities (temperature $T_{2.5}$ at log η=2.5 i.e. at which the viscosity is $10^{2.5}$ poise, and temperature $T_{4.0}$ at log η=4.0 i.e. at which the viscosity is $10^{4.0}$ poise), liquidus temperatures, strain points, densities, BHF resistance and HCl resistance, are shown. Among them, the low temperature at log η=2.5 is an index for easy melting, and a temperature at log η=4.0 higher than the liquidus temperature is an index for easy forming.

The HCl resistance is represented by the weight loss per unit area (mg/cm$^2$) of the glass after immersion at 95° C. for 20 hours in 0.1N HCl.

The BHF resistance is represented by the weight loss per unit area (mg/cm$^2$) after immersion at 25° C. for 20 minutes in a liquid prepared by mixing a 40 wt % ammonium fluoride aqueous solution and a 50 wt % hydrofluoric acid aqueous solution in a volume ratio of 9:1.

Examples 1 to 40 shown in Tables 1 to 9 are Examples of the present invention. Whereas, Examples 41 to 47 in Table 9 and 10 are Comparative Examples.

Example 41 represents an Example wherein $B_2O_3$ was incorporated excessively, whereby the strain point was low, and the HCl resistance was poor. On the other hand, Examples 42 and 43 represent Examples wherein $B_2O_3$ was inadequate, whereby the BHF resistance was poor, although the strain point and the HCl resistance were satisfactory.

Example 44 represents an Example wherein $B_2O_3$ was in a proper amount, but the $Al_2O_3/B_2O_3$ ratio was increased too much by increasing $Al_2O_3$ relatively, whereby deterioration in the BHF resistance was observed.

Example 45 represents an Example wherein $Al_2O_3$ was in a proper amount, but the $Al_2O_3/B_2O_3$ ratio was decreased too much by increasing $B_2O_3$ relatively, whereby the HCl resistance deteriorated as the strain point became low.

Examples 46 and 47 represent Examples wherein SrO+BaO was reduced too much, whereby the liquidus temperature exceeded a temperature at which the viscosity was $10^4$ poise, thus indicating a difficulty in the forming property.

TABLE 1

| | | 1 | | | 2 | | | 3 | | | 4 | | | 5 | | |
|---|---|---|---|---|---|---|---|---|---|---|---|---|---|---|---|---|
| | | mol % | wt % | cat % | mol % | wt % | cat % | mol % | wt % | cat % | mol % | wt % | cat % | mol % | wt % | cat % |
| Composition | $SiO_2$ | 65.0 | 55.5 | 52.3 | 64.0 | 54.7 | 52.0 | 63.0 | 53.9 | 51.2 | 65.0 | 55.2 | 52.4 | 65.0 | 54.7 | 52.0 |
| | $Al_2O_3$ | 12.0 | 17.4 | 19.5 | 12.0 | 17.4 | 19.5 | 12.0 | 17.4 | 19.5 | 13.0 | 18.7 | 21.0 | 14.0 | 20.0 | 22.4 |
| | $B_2O_3$ | 11.0 | 10.9 | 17.9 | 11.0 | 10.9 | 17.9 | 11.0 | 10.9 | 17.9 | 11.0 | 10.8 | 17.7 | 11.0 | 10.7 | 17.6 |
| | MgO | 2.5 | 1.4 | 2.0 | 2.5 | 1.4 | 2.0 | 2.5 | 1.4 | 2.0 | 2.5 | 1.4 | 2.0 | 1.5 | 0.8 | 1.2 |
| | CaO | 2.5 | 2.0 | 2.0 | 3.5 | 2.8 | 2.8 | 4.5 | 3.6 | 3.7 | 1.5 | 1.2 | 1.2 | 1.5 | 1.2 | 1.2 |
| | SrO | 3.5 | 5.2 | 2.8 | 3.5 | 6.2 | 2.8 | 3.5 | 5.2 | 2.8 | 3.5 | 5.1 | 2.8 | 3.5 | 5.1 | 2.8 |
| | BaO | 3.5 | 7.6 | 2.8 | 3.5 | 7.6 | 2.8 | 3.5 | 7.6 | 2.8 | 3.5 | 7.6 | 2.8 | 3.5 | 7.5 | 2.8 |
| | total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $\alpha$ ($\times 10^{-7}$/°C.) | | | 36 | | | 37 | | | 39 | | | 35 | | | 34 | | |
| Strain point (°C.) | | | 660 | | | 655 | | | 655 | | | 665 | | | 665 | | |
| Density (g/cc) | | | 2.53 | | | 2.55 | | | 2.59 | | | 2.52 | | | 2.51 | | |
| $T_{2.5}$ (log $\eta$ = 2.5) | | | 1550° C. | | | 1525° C. | | | 1500° C. | | | 1675° C. | | | 1590° C. | | |
| $T_{4.0}$ (log $\eta$ = 4.0) | | | 1285° C. | | | 1265° C. | | | 1240° C. | | | 1305° C. | | | 1300° C. | | |
| BHF resistance (mg/cm$^2$) | | | 0.52 | | | 0.52 | | | 0.55 | | | 0.52 | | | 0.53 | | |
| HCl resistance (mg/cm$^2$) | | | 0.12 | | | 0.12 | | | 0.12 | | | 0.12 | | | 0.12 | | |
| Liquidus temp. | | | 1250° C. | | | 1250° C. | | | 1250° C. | | | 1300° C. | | | 1300° C. | | |

TABLE 2

| | | 6 | | | 7 | | | 8 | | | 9 | | | 10 | | |
|---|---|---|---|---|---|---|---|---|---|---|---|---|---|---|---|---|
| | | mol % | wt % | cat % | mol % | wt % | cat % | mol % | wt % | cat % | mol % | wt % | cat % | mol % | wt % | cat % |
| Composition | $SiO_2$ | 66.0 | 55.4 | 52.8 | 63.0 | 53.4 | 51.2 | 63.0 | 52.4 | 50.8 | 60.0 | 50.1 | 47.2 | 63.0 | 52.8 | 50.0 |
| | $Al_2O_3$ | 14.0 | 19.9 | 22.4 | 12.0 | 17.3 | 19.5 | 13.0 | 18.3 | 21.0 | 16.0 | 22.7 | 25.2 | 15.0 | 21.3 | 23.8 |
| | $B_2O_3$ | 11.0 | 10.7 | 17.6 | 11.0 | 10.8 | 17.9 | 11.0 | 10.6 | 17.7 | 11.0 | 10.6 | 17.3 | 11.0 | 10.7 | 17.5 |
| | MgO | 0.5 | 0.3 | 0.4 | 3.0 | 1.7 | 2.4 | 2.0 | 1.1 | 1.6 | 3.0 | 1.7 | 2.4 | 2.0 | 1.1 | 1.6 |
| | CaO | 1.5 | 1.2 | 1.2 | 3.0 | 2.4 | 2.4 | 2.0 | 1.6 | 1.6 | 3.0 | 2.3 | 2.4 | 2.0 | 1.6 | 1.6 |
| | SrO | 3.5 | 5.1 | 2.8 | 4.0 | 5.8 | 3.3 | 4.5 | 6.5 | 3.6 | 3.5 | 5.0 | 2.8 | 3.5 | 5.1 | 2.8 |
| | BaO | 3.5 | 7.5 | 2.8 | 4.0 | 8.6 | 3.3 | 4.5 | 9.5 | 3.6 | 3.5 | 7.5 | 2.8 | 3.5 | 7.5 | 2.8 |
| | total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $\alpha$ ($\times 10^{-7}$/°C.) | | | 33 | | | 39 | | | 39 | | | 37 | | | 35 | | |
| Strain point (°C.) | | | 670 | | | 655 | | | 655 | | | 655 | | | 660 | | |
| Density (g/cc) | | | 2.49 | | | 2.59 | | | 2.60 | | | 2.57 | | | 2.53 | | |
| $T_{2.5}$ (log $\eta$ = 2.5) | | | 1615° C. | | | 1520° C. | | | 1540° C. | | | 1530° C. | | | 1575° C. | | |
| $T_{4.0}$ (log $\eta$ = 4.0) | | | 1320° C. | | | 1250° C. | | | 1245° C. | | | 1240° C. | | | 1280° C. | | |
| BHF resistance (mg/cm$^2$) | | | 0.50 | | | 0.55 | | | 0.56 | | | 0.55 | | | 0.52 | | |
| HCl resistance (mg/cm$^2$) | | | 0.12 | | | 0.13 | | | 0.14 | | | 0.12 | | | 0.12 | | |
| Liquidus temp. | | | 1300° C. | | | 1250° C. | | | 1200° C. | | | 1200° C. | | | 1250° C. | | |

TABLE 3

| | | 11 | | | 12 | | | 13 | | | 14 | | | 15 | | |
|---|---|---|---|---|---|---|---|---|---|---|---|---|---|---|---|---|
| | | mol % | wt % | cat % | mol % | wt % | cat % | mol % | wt % | cat % | mol % | wt % | cat % | mol % | wt % | cat % |
| Composition | $SiO_2$ | 64.0 | 52.5 | 51.6 | 68.0 | 58.6 | 56.2 | 67.0 | 57.5 | 54.3 | 68.0 | 58.7 | 55.5 | 67.0 | 57.9 | 54.7 |
| | $Al_2O_3$ | 13.0 | 18.1 | 21.0 | 10.0 | 14.6 | 16.5 | 13.0 | 18.9 | 21.1 | 12.0 | 17.6 | 19.6 | 12.0 | 17.6 | 19.6 |
| | $B_2O_3$ | 11.0 | 10.5 | 17.7 | 11.0 | 11.0 | 18.2 | 10.5 | 10.4 | 17.0 | 10.5 | 10.5 | 17.1 | 10.5 | 10.5 | 17.1 |
| | MgO | 1.0 | 0.6 | 0.8 | 1.5 | 0.9 | 1.2 | 3.0 | 1.7 | 2.4 | 3.0 | 1.7 | 2.4 | 3.0 | 1.7 | 2.4 |
| | CaO | 1.0 | 0.8 | 0.8 | 2.5 | 2.0 | 2.1 | 0.5 | 0.4 | 0.4 | 0.5 | 0.4 | 0.4 | 1.5 | 1.2 | 1.2 |
| | SrO | 5.0 | 7.1 | 4.0 | 3.5 | 5.2 | 2.9 | 3.0 | 4.4 | 2.4 | 3.0 | 4.5 | 2.4 | 3.0 | 4.5 | 2.4 |
| | BaO | 5.0 | 10.5 | 4.0 | 3.5 | 7.7 | 2.9 | 3.0 | 6.6 | 2.4 | 3.0 | 6.6 | 2.4 | 3.0 | 6.6 | 2.4 |
| | total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $\alpha$ ($\times 10^{-7}$/°C.) | | | 38 | | | 36 | | | 31 | | | 31 | | | 33 | | |
| Strain point (°C.) | | | 660 | | | 660 | | | 685 | | | 680 | | | 670 | | |
| Density (g/cc) | | | 2.60 | | | 2.52 | | | 2.49 | | | 2.47 | | | 2.49 | | |
| $T_{2.5}$ (log $\eta$ = 2.5) | | | 1550° C. | | | 1675° C. | | | 1620° C. | | | 1620° C. | | | 1595° C. | | |
| $T_{4.0}$ (log $\eta$ = 4.0) | | | 1285° C. | | | 1305° C. | | | 1330° C. | | | 1330° C. | | | 1315° C. | | |
| BHF resistance (mg/cm$^2$) | | | 0.56 | | | 0.54 | | | 0.51 | | | 0.51 | | | 0.51 | | |

TABLE 3-continued

|  | 11 | | | 12 | | | 13 | | | 14 | | | 15 | | |
|---|---|---|---|---|---|---|---|---|---|---|---|---|---|---|---|
|  | mol % | wt % | cat % | mol % | wt % | cat % | mol % | wt % | cat % | mol % | wt % | cat % | mol % | wt % | cat % |
| HCl resistance (mg/cm$^2$) | 0.13 | | | 0.12 | | | 0.11 | | | 0.11 | | | 0.11 | | |
| Liquidus temp. | 1225° C. | | | 1250° C. | | | 1300° C. | | | 1300° C. | | | 1300° C. | | |

TABLE 4

|  |  | 16 | | | 17 | | | 18 | | | 19 | | | 20 | | |
|---|---|---|---|---|---|---|---|---|---|---|---|---|---|---|---|---|
|  |  | mol % | wt % | cat % | mol % | wt % | cat % | mol % | wt % | cat % | mol % | wt % | cat % | mol % | wt % | cat % |
| Composition | SiO$_2$ | 67.0 | 57.4 | 54.3 | 66.0 | 56.6 | 53.4 | 64.0 | 55.4 | 52.2 | 63.5 | 54.5 | 51.8 | 66.0 | 56.8 | 54.0 |
|  | Al$_2$O$_3$ | 12.0 | 17.4 | 19.7 | 12.0 | 17.5 | 19.4 | 12.0 | 17.6 | 19.6 | 12.0 | 17.5 | 19.6 | 12.0 | 17.5 | 1g.7 |
|  | B$_2$O$_3$ | 10.5 | 10.4 | 17.0 | 10.5 | 10.4 | 17.0 | 10.5 | 10.5 | 17.1 | 10.5 | 10.4 | 17.1 | 10.0 | 10.0 | 16.4 |
|  | MgO | 3.0 | 1.7 | 2.4 | 3.0 | 1.7 | 2.4 | 3.0 | 1.7 | 2.4 | 3.5 | 2.0 | 2.9 | 1.0 | 0.6 | 0.8 |
|  | CaO | 2.5 | 2.0 | 2.0 | 3.5 | 2.8 | 2.8 | 4.5 | 3.6 | 3.7 | 3.5 | 2.8 | 2.9 | 5.0 | 4.0 | 4.1 |
|  | SrO | 3.0 | 4.4 | 2.4 | 3.0 | 4.4 | 2.4 | 3.0 | 4.5 | 2.4 | 3.5 | 5.2 | 2.9 | 3.0 | 4.5 | 2.5 |
|  | BaO | 3.0 | 6.6 | 2.4 | 3.0 | 6.6 | 2.4 | 3.0 | 6.6 | 2.4 | 3.5 | 7.7 | 2.9 | 3.0 | 6.6 | 2.5 |
|  | total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| α (× 10$^{-7}$/°C.) | | 35 | | | 37 | | | 38 | | | 39 | | | 38 | | |
| Strain point (°C.) | | 665 | | | 660 | | | 660 | | | 660 | | | 675 | | |
| Density (g/cc) | | 2.51 | | | 2.52 | | | 2.54 | | | 2.57 | | | 2.63 | | |
| T$_{2.5}$ (log η = 2.5) | | 1565° C. | | | 1540° C. | | | 1515° C. | | | 1515° C. | | | 1570° C. | | |
| T$_{4.0}$ (log η = 4.0) | | 1290° C. | | | 1270° C. | | | 1250° C. | | | 1260° C. | | | 1305° C. | | |
| BHF resistance (mg/cm$^2$) | | 0.52 | | | 0.53 | | | 0.54 | | | 0.53 | | | 0.55 | | |
| HCl resistance (mg/cm$^2$) | | 0.12 | | | 0.12 | | | 0.12 | | | 0.12 | | | 0.12 | | |
| Liquidus temp. | | 1275° C. | | | 1250° C. | | | 1250° C. | | | 1250° C. | | | 1300° C. | | |

TABLE 5

|  |  | 21 | | | 22 | | | 23 | | | 24 | | | 25 | | |
|---|---|---|---|---|---|---|---|---|---|---|---|---|---|---|---|---|
|  |  | mol % | wt % | cat % | mol % | wt % | cat % | mol % | wt % | cat % | mol % | wt % | cat % | mol % | wt % | cat % |
| Composition | SiO$_2$ | 66.0 | 57.1 | 54.1 | 63.5 | 54.2 | 51.4 | 64.5 | 55.0 | 52.2 | 64.5 | 54.6 | 51.8 | 63.5 | 53.1 | 50.2 |
|  | Al$_2$O$_3$ | 12.0 | 17.6 | 19.7 | 12.0 | 17.2 | 19.4 | 12.0 | 17.4 | 19.4 | 13.0 | 18.7 | 20.9 | 15.0 | 21.3 | 23.7 |
|  | B$_2$O$_3$ | 10.0 | 10.0 | 16.4 | 11.5 | 11.4 | 18.6 | 11.5 | 11.4 | 18.6 | 11.5 | 11.3 | 18.7 | 11.5 | 11.1 | 18.2 |
|  | MgO | 3.0 | 1.7 | 2.5 | 2.5 | 1.4 | 2.0 | 2.5 | 1.4 | 2.0 | 1.5 | 0.9 | 1.2 | 1.5 | 0.8 | 1.2 |
|  | CaO | 3.0 | 2.4 | 2.5 | 3.5 | 2.8 | 2.8 | 2.5 | 2.8 | 2.0 | 2.5 | 2.0 | 2.0 | 1.5 | 1.2 | 1.2 |
|  | SrO | 3.0 | 4.5 | 2.5 | 3.5 | 5.2 | 2.8 | 3.5 | 5.2 | 2.8 | 3.5 | 5.1 | 2.8 | 3.5 | 5.0 | 2.8 |
|  | BaO | 3.0 | 6.6 | 2.5 | 3.5 | 7.6 | 2.8 | 3.5 | 7.6 | 2.8 | 3.5 | 7.6 | 2.8 | 3.5 | 7.5 | 2.8 |
|  | total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| α (× 10$^{-7}$/°C.) | | 36 | | | 38 | | | 36 | | | 36 | | | 33 | | |
| Strain point (°C.) | | 675 | | | 655 | | | 655 | | | 655 | | | 660 | | |
| Density (g/cc) | | 2.53 | | | 2.56 | | | 2.54 | | | 2.52 | | | 2.51 | | |
| T$_{2.5}$ (log η = 2.5) | | 1570° C. | | | 1520° C. | | | 1550° C. | | | 1585° C. | | | 1600° C. | | |
| T$_{4.0}$ (log η = 4.0) | | 1305° C. | | | 1260° C. | | | 1280° C. | | | 1290° C. | | | 1300° C. | | |
| BHF resistance (mg/cm$^2$) | | 0.54 | | | 0.50 | | | 0.49 | | | 0.48 | | | 0.46 | | |
| HCl resistance (mg/cm$^2$) | | 0.12 | | | 0.15 | | | 0.14 | | | 0.14 | | | 0.14 | | |
| Liquidus temp. | | 1300° C. | | | 1250° C. | | | 1250° C. | | | 1250° C. | | | 1250° C. | | |

TABLE 6

|  |  | 26 | | | 27 | | | 28 | | | 29 | | | 30 | | |
|---|---|---|---|---|---|---|---|---|---|---|---|---|---|---|---|---|
|  |  | mol % | wt % | cat % | mol % | wt % | cat % | mol % | wt % | cat % | mol % | wt % | cat % | mol % | wt % | cat % |
| Composition | SiO$_2$ | 63.5 | 54.2 | 51.6 | 66.0 | 55.9 | 52.4 | 67.5 | 53.7 | 55.3 | 69.0 | 57.0 | 55.6 | 67.0 | 54.0 | 54.5 |
|  | Al$_2$O$_3$ | 12.0 | 17.4 | 19.5 | 12.0 | 17.5 | 19.4 | 11.0 | 14.8 | 18.0 | 12.0 | 16.8 | 19.4 | 12.0 | 16.4 | 19.5 |

TABLE 6-continued

| | | 26 | | | 27 | | | 28 | | | 29 | | | 30 | | |
|---|---|---|---|---|---|---|---|---|---|---|---|---|---|---|---|---|
| | | mol % | wt % | cat % | mol % | wt % | cat % | mol % | wt % | cat % | mol % | wt % | cat % | mol % | wt % | cat % |
| | $B_2O_3$ | 12.0 | 11.9 | 19.5 | 12.0 | 12.0 | 19.4 | 11.0 | 10.1 | 18.0 | 12.0 | 11.5 | 19.4 | 11.0 | 10.3 | 17.9 |
| | MgO | 2.0 | 1.1 | 1.6 | 2.0 | 1.2 | 1.6 | 0.0 | 0.0 | 0.0 | 0.0 | 0.0 | 0.0 | 0.0 | 0.0 | 0.0 |
| | CaO | 3.5 | 2.8 | 2.8 | 3.0 | 2.4 | 2.4 | 0.0 | 0.0 | 0.0 | 0.0 | 0.0 | 0.0 | 0.0 | 0.0 | 0.0 |
| | SrO | 3.5 | 5.2 | 2.8 | 3.0 | 4.5 | 2.4 | 0.0 | 0.0 | 0.0 | 0.0 | 0.0 | 0.0 | 2.0 | 2.8 | 1.6 |
| | BaO | 3.5 | 7.6 | 2.8 | 3.0 | 6.6 | 2.4 | 10.5 | 21.3 | 8.6 | 7.0 | 14.7 | 5.6 | 8.0 | 16.5 | 6.5 |
| total | | 100.0 | 100.2 | 100.6 | 100.0 | 100.0 | 100.0 | 100.0 | 100.0 | 100.0 | 100.0 | 100.0 | 100.0 | 100.0 | 100.0 | 100.0 |
| $\alpha$ (× $10^{-7}$/°C.) | | | 38 | | | 35 | | | 40 | | | 32 | | | 37 | |
| Strain point (°C.) | | | 655 | | | 655 | | | 655 | | | 655 | | | 655 | |
| Density (g/cc) | | | 2.55 | | | 2.50 | | | 2.66 | | | 2.51 | | | 2.61 | |
| $T_{2.5}$ (log $\eta$ = 2.5) | | | 1520° C. | | | 1565° C. | | | 1570° C. | | | 1640° C. | | | 1530° C. | |
| $T_{4.0}$ (log $\eta$ = 4.0) | | | 1260° C. | | | 1280° C. | | | 1350° C. | | | 1360° C. | | | 1360° C. | |
| BHF resistance (mg/cm$^2$) | | | 0.48 | | | 0.46 | | | 0.59 | | | 0.58 | | | 0.59 | |
| HCl resistance (mg/cm$^2$) | | | 0.17 | | | 0.16 | | | 0.19 | | | 0.19 | | | 0.19 | |
| Liquidus temp. | | | 1250° C. | | | 1250° C. | | | 1300° C. | | | 1320° C. | | | 1310° C. | |

TABLE 7

| | | 31 | | | 32 | | | 33 | | | 34 | | | 35 | | |
|---|---|---|---|---|---|---|---|---|---|---|---|---|---|---|---|---|
| | | mol % | wt % | cat % | mol % | wt % | cat % | mol % | wt % | cat % | mol % | wt % | cat % | mol % | wt % | cat % |
| Composition | $SiO_2$ | 67.0 | 55.6 | 54.5 | 66.5 | 54.1 | 54.7 | 69.0 | 59.9 | 55.2 | 66.5 | 56.5 | 54.5 | 67.5 | 58.0 | 54.4 |
| | $Al_2O_3$ | 12.0 | 16.9 | 19.5 | 11.0 | 15.2 | 18.1 | 15.0 | 21.0 | 24.0 | 11.0 | 15.9 | 18.0 | 12.0 | 17.5 | 19.4 |
| | $B_2O_3$ | 11.0 | 10.6 | 17.9 | 10.5 | 9.9 | 17.3 | 10.0 | 9.5 | 16.0 | 11.0 | 10.8 | 18.0 | 12.0 | 11.9 | 19.4 |
| | MgO | 1.0 | 0.6 | 0.8 | 0.0 | 0.0 | 0.0 | 0.0 | 0.0 | 0.0 | 0.0 | 0.0 | 0.0 | 0.0 | 0.0 | 0.0 |
| | CaO | 1.0 | 0.8 | 0.8 | 0.0 | 0.0 | 0.0 | 0.0 | 0.0 | 0.0 | 0.0 | 0.0 | 0.0 | 0.0 | 0.0 | 0.0 |
| | SrO | 2.0 | 2.9 | 1.6 | 6.0 | 8.4 | 4.9 | 0.0 | 0.0 | 0.0 | 11.5 | 16.8 | 9.4 | 8.5 | 12.6 | 6.9 |
| | BaO | 6.0 | 12.7 | 4.9 | 6.0 | 12.4 | 4.9 | 6.0 | 12.6 | 4.8 | 0.0 | 0.0 | 0.0 | 0.0 | 0.0 | 0.0 |
| total | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $\alpha$ (× $10^{-7}$/°C.) | | | 36 | | | 40 | | | 30 | | | 40 | | | 33 | |
| Strain point (°C.) | | | 655 | | | 655 | | | 660 | | | 655 | | | 655 | |
| Density (g/cc) | | | 2.55 | | | 2.64 | | | 2.47 | | | 2.53 | | | 2.44 | |
| $T_{2.5}$ (log $\eta$ = 2.5) | | | 1600° C. | | | 1530° C. | | | 1750° C. | | | 1600° C. | | | 1580° C. | |
| $T_{4.0}$ (log $\eta$ = 4.0) | | | 1330° C. | | | 1350° C. | | | 1400° C. | | | 1310° C. | | | 1420° C. | |
| BHF resistance (mg/cm$^2$) | | | 0.58 | | | 0.58 | | | 0.55 | | | 0.58 | | | 0.55 | |
| HCl resistance (mg/cm$^2$) | | | 0.18 | | | 0.16 | | | 0.15 | | | 0.18 | | | 0.18 | |
| Liquidus temp. | | | 1300° C. | | | 1300° C. | | | 1390° C. | | | 1280° C. | | | 1380° C. | |

TABLE 8

| | | 36 | | | 37 | | | 38 | | | 39 | | | 40 | | |
|---|---|---|---|---|---|---|---|---|---|---|---|---|---|---|---|---|
| | | mol % | wt % | cat % | mol % | wt % | cat % | mol % | wt % | cat % | mol % | wt % | cat % | mol % | wt % | cat % |
| Composition | $SiO_2$ | 66.0 | 55.7 | 54.5 | 67.0 | 57.2 | 54.5 | 70.0 | 59.1 | 56.9 | 71.0 | 60.3 | 58.2 | 72.0 | 60.6 | 58.5 |
| | $Al_2O_3$ | 11.0 | 15.8 | 18.2 | 12.0 | 17.4 | 19.5 | 12.0 | 17.1 | 19.5 | 12.0 | 15.8 | 18.0 | 11.0 | 15.7 | 17.9 |
| | $B_2O_3$ | 10.0 | 9.8 | 16.5 | 11.0 | 10.9 | 17.9 | 11.0 | 10.8 | 17.9 | 11.0 | 10.8 | 18.0 | 11.0 | 10.7 | 17.9 |
| | MgO | 1.0 | 0.6 | 0.8 | 1.0 | 0.6 | 0.8 | 0.0 | 0.0 | 0.8 | 0.0 | 0.0 | 0.0 | 0.0 | 0.0 | 0.8 |
| | CaO | 1.0 | 0.8 | 0.8 | 1.0 | 0.8 | 0.8 | 0.0 | 0.0 | 0.8 | 0.0 | 0.0 | 0.0 | 0.0 | 0.0 | 0.8 |
| | SrO | 9.0 | 13.1 | 7.4 | 6.0 | 8.8 | 4.9 | 3.0 | 4.4 | 2.4 | 3.0 | 4.4 | 2.5 | 3.0 | 4.4 | 2.4 |
| | BaO | 2.0 | 4.3 | 1.7 | 2.0 | 4.4 | 1.6 | 4.0 | 8.6 | 3.3 | 3.0 | 8.7 | 3.3 | 4.0 | 8.6 | 3.3 |
| total | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $\alpha$ (× $10^{-7}$/°C.) | | | 40 | | | 36 | | | 30 | | | 27 | | | 27 | |
| Strain point (°C.) | | | 655 | | | 660 | | | 655 | | | 655 | | | 655 | |
| Density (g/cc) | | | 2.60 | | | 2.50 | | | 2.44 | | | 2.40 | | | 2.39 | |
| $T_{2.5}$ (log $\eta$ = 2.5) | | | 1510° C. | | | 1580° C. | | | 1680° C. | | | 1700° C. | | | 1710° C. | |
| $T_{4.0}$ (log $\eta$ = 4.0) | | | 1330° C. | | | 1340° C. | | | 1360° C. | | | 1360° C. | | | 1360° C. | |
| BHF resistance (mg/cm$^2$) | | | 0.58 | | | 0.58 | | | 0.59 | | | 0.58 | | | 0.57 | |
| HCl resistance (mg/cm$^2$) | | | 0.14 | | | 0.17 | | | 0.18 | | | 0.16 | | | 0.16 | |
| Liquidus temp. | | | 1310° C. | | | 1340° C. | | | 1320° C. | | | 1320° C. | | | 1300° C. | |

TABLE 9

| | | 41 | | | 42 | | | 43 | | | 44 | | | 45 | | |
|---|---|---|---|---|---|---|---|---|---|---|---|---|---|---|---|---|
| | | mol % | wt % | cat % | mol % | wt % | cat % | mol % | wt % | cat % | mol % | wt % | cat % | mol % | wt % | cat % |
| Composition | SiO$_2$ | 63.5 | 53.9 | 50.8 | 65.0 | 55.6 | 54.2 | 66.7 | 58.6 | 55.0 | 57.0 | 47.0 | 43.5 | 62.0 | 52.1 | 49.2 |
| | Al$_2$O$_3$ | 12.0 | 17.3 | 19.2 | 12.0 | 17.4 | 20.0 | 11.5 | 17.1 | 19.0 | 20.0 | 28.0 | 30.5 | 12.0 | 17.1 | 19.0 |
| | B$_2$O$_3$ | 13.0 | 12.8 | 20.8 | 9.0 | 8.9 | 15.0 | 9.7 | 9.9 | 16.0 | 11.0 | 10.5 | 16.8 | 14.0 | 13.6 | 22.2 |
| | MgO | 1.0 | 0.6 | 0.8 | 2.0 | 1.1 | 1.7 | 2.4 | 1.4 | 2.0 | 3.0 | 1.7 | 2.3 | 2.0 | 1.1 | 1.6 |
| | CaO | 3.5 | 2.8 | 2.8 | 3.0 | 2.4 | 2.5 | 4.9 | 4.0 | 4.0 | 3.0 | 2.3 | 2.3 | 2.0 | 1.6 | 1.6 |
| | SrO | 3.5 | 5.1 | 2.8 | 4.0 | 5.9 | 3.3 | 2.4 | 3.6 | 2.0 | 3.0 | 4.3 | 2.3 | 4.0 | 5.8 | 3.2 |
| | BaO | 3.5 | 7.6 | 2.8 | 4.0 | 8.7 | 3.3 | 2.4 | 5.4 | 2.0 | 3.0 | 6.3 | 2.3 | 4.0 | 8.6 | 3.2 |
| | total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| α (× 10$^{-7}$/°C.) | | | 37 | | | 36 | | | 36 | | | 35 | | | 36 | | |
| Strain point (°C.) | | | 640 | | | 665 | | | 675 | | | 695 | | | 625 | | |
| Density (g/cc) | | | 2.53 | | | 2.57 | | | 2.49 | | | 2.55 | | | 2.55 | | |
| T$_{2.5}$ (log η = 2.5) | | | 1525°C. | | | 1565°C. | | | 1565°C. | | | 1520°C. | | | 1480°C. | | |
| T$_{4.0}$ (log η = 4.0) | | | 1245°C. | | | 1290°C. | | | 1280°C. | | | 1260°C. | | | 1230°C. | | |
| BHF resistance (mg/cm$^2$) | | | 0.45 | | | 0.60 | | | 0.60 | | | 0.62 | | | 0.43 | | |
| HCl resistance (mg/cm$^2$) | | | 0.21 | | | 0.08 | | | 0.10 | | | 0.12 | | | 0.26 | | |
| Liquidus temp. | | | 1250°C. | | | 1250°C. | | | 1200°C. | | | 1250°C. | | | 1150°C. | | |

TABLE 10

| | | 46 | | | 47 | | |
|---|---|---|---|---|---|---|---|
| | | mol % | wt % | cat % | mol % | wt % | cat % |
| Composition | SiO$_2$ | 63.9 | 57.2 | 53.6 | 64.6 | 57.7 | 53.1 |
| | Al$_2$O$_3$ | 11.5 | 17.5 | 19.3 | 11.8 | 17.9 | 19.4 |
| | B$_2$O$_3$ | 10.0 | 10.4 | 16.8 | 11.0 | 11.4 | 18.1 |
| | MgO | 2.2 | 1.3 | 1.8 | 2.2 | 1.3 | 1.8 |
| | CaO | 5.3 | 4.4 | 4.4 | 5.3 | 4.4 | 4.4 |
| | SrO | 2.6 | 4.0 | 2.2 | 2.4 | 3.7 | 2.0 |
| | BaO | 2.3 | 5.3 | 1.9 | 1.6 | 3.6 | 1.3 |
| | total | 100.0 | 100.0 | 100.0 | 98.9 | 100.0 | 100.0 |
| α (× 10$^{-7}$/°C.) | | | 37 | | | 37 | | |
| Strain point (°C.) | | | 640 | | | 640 | | |
| Density (g/cc) | | | 2.50 | | | 2.50 | | |
| T$_{2.5}$ (log η = 2.5) | | | 1540° C. | | | 1540° C. | | |
| T$_{4.0}$ (log η = 4.0) | | | 1250° C. | | | 1250° C. | | |
| BHF resistance (mg/cm$^2$) | | | 0.60 | | | 0.56 | | |
| HCl resistance (mg/cm$^2$) | | | 0.10 | | | 0.10 | | |
| Liquidus temp. | | | 1275° C. | | | 1275° C. | | |

According to the present invention, it is possible to obtain a glass which is free from adversely affecting a coating film of e.g. a transistor formed on a substrate, when it is used for a substrate of a display.

The glass of the present invention makes it possible to eliminate the necessity of the pretreatment to reduce the shrinkage of glass in a process for preparing a display, depending upon the annealing conditions. Further, it is strong against thermal shock, whereby the throughput for production of display panels or the like can be improved.

Further, the BHF resistance and the HCl resistance are excellent, whereby the glass is sufficiently durable against chemical treatment in the process for preparing liquid crystal panels, even when it is used as a substrate for liquid display panels of a thin film transistor system.

What is claimed is:

1. An alkali-free glass consisting essentially of from 60 to 68 mol % of SiO$_2$, from 10 to 16 mol % of Al$_2$O$_3$, from 10 to 12 mol % of B$_2$O$_3$, said Al$_2$O$_3$ and B$_2$O$_3$ being present in a molar ratio of from 1.0 to 1.5, from 0 to 5 mol % of MgO, from 0 to 5 mol % of CaO, from 3 to 5 mol % of SrO, from 3 to 5 mol % of BaO, and from 6 to 8 mol % of SrO+BaO, which contains substantially no alkali metal oxide and has a strain point exceeding 650° C. and an average thermal expansion coefficient of at most 40×10$^{-7}$/°C. within a range of from 50° to 300° C., and of which the weight loss per unit area after immersion at 25° C. for 20 minutes in a liquid prepared by mixing a 40 wt. % ammonium fluoride aqueous solution and a 50 wt. % hydrofluoric acid aqueous solution in a volume ratio of 9:1, is less than 0.56 mg/cm$^2$, the weight loss per unit area after immersion at 95° C. for 20 hours and 0.1 NHCl, is less than 0.20 mg/cm$^2$ and the liquidus temperature is at most a temperature at which the viscosity is 10$^4$ poise.

2. A display, comprising a substrate made of the glass of claim 1, and displaying means thereon.

3. The alkali-free glass according to claim 1, which contains substantially no P$_2$O$_5$.

4. The alkali-free glass according to claim 1, which contains substantially no PbO.

5. The alkali-free glass according to claim 1, which consists essentially of from 60 to 68 mol % of SiO$_2$, from 10 to 16 mol % of Al$_2$O$_3$, from 10.5 to 1.115 mol % B$_2$O$_3$, the molar ratio of Al$_2$O$_3$/B$_2$O$_3$ being from 1.0 to 1.5, from 0 to 5 mol % of MgO, from 0 to 5 mol % of CaO, from 3 to 5 mol % of SrO, from 3 to 5 mol % of BaO, and with at least 6 mol % of SrO+BaO.

6. The alkali-free glass according to claim 1, which has an average thermal expansion coefficient of from 30×10$^{31\ 7}$ to 40×10$^{-7}$/°C. within a range of from 50° to 300° C.

7. The alkali-free glass according to claim 1, of which the weight loss per unit area after immersion at 95° C. for 20 hours in 0.1N HCl, is less than 0.18 mg/cm$^2$.

8. The alkali-free glass according to claim 1, which is formed by a float process.

* * * * *